(12) United States Patent
Golling et al.

(10) Patent No.: US 11,794,839 B2
(45) Date of Patent: Oct. 24, 2023

(54) CARRIER ARRANGEMENT FOR LATERAL LUGGAGE CONTAINERS OF A MOTORCYCLE

(71) Applicant: Bayerische Motoren Werke Aktiengesellschaft, Munich (DE)

(72) Inventors: Adrian Golling, Groebenzell (DE); Mathias Muehlmann, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 459 days.

(21) Appl. No.: 16/718,788

(22) Filed: Dec. 18, 2019

(65) Prior Publication Data
US 2020/0122800 A1   Apr. 23, 2020

Related U.S. Application Data

(63) Continuation of application No. PCT/EP2018/065917, filed on Jun. 15, 2018.

(30) Foreign Application Priority Data

Jul. 26, 2017 (DE) ...................... 10 2017 212 790.2

(51) Int. Cl.
B62J 9/24 (2020.01)
B62J 7/04 (2006.01)
B62J 9/23 (2020.01)

(52) U.S. Cl.
CPC . *B62J 9/24* (2020.02); *B62J 7/04* (2013.01); *B62J 9/23* (2020.02)

(58) Field of Classification Search
CPC ......................................................... B62J 7/04
(Continued)

(56) References Cited

U.S. PATENT DOCUMENTS 4,174,795 A * 11/1979 Jackson ..................... B62J 9/27
224/438
4,266,702 A * 5/1981 Jackson ..................... B62J 9/00
224/430
(Continued)

FOREIGN PATENT DOCUMENTS

CA    2975345 A1 *  3/2019  ................ B62J 7/04
CN    2363945 Y     2/2000
(Continued)

OTHER PUBLICATIONS

Merriam-Webster.com (accessed Mar. 23, 2023), https://www.merriam-webster.com/dictionary/carrier.*
(Continued)

*Primary Examiner* — Nathan J Newhouse
*Assistant Examiner* — Lester L Vanterpool
(74) *Attorney, Agent, or Firm* — Crowell & Moring LLP (57) ABSTRACT

A connecting arrangement is provided for fastening lateral luggage containers on a motor vehicle, in particular to a motorcycle or a motorcycle-like vehicle, and a vehicle including the connecting arrangement. The connecting arrangement includes a rear vehicle frame section and a carrier element movably connected thereon. The carrier element extends transversely to a longitudinal direction of the vehicle frame section, and has a lateral left-hand end designed for connecting to a left-hand luggage container and at a lateral right-hand end designed for connecting to a right-hand luggage container. The invention further relates to a vehicle having a corresponding connecting arrangement.

15 Claims, 7 Drawing Sheets

(58) Field of Classification Search
USPC .......................................................... 224/447
See application file for complete search history.

(56) References Cited

U.S. PATENT DOCUMENTS

| | | | | |
|---|---|---|---|---|
| 4,325,531 | A * | 4/1982 | Omholt | B62J 9/30 |
| | | | | 248/553 |
| 4,353,490 | A * | 10/1982 | Jackson | B62J 7/08 |
| | | | | 224/438 |
| 4,562,944 | A * | 1/1986 | Jackson | B62J 7/08 |
| | | | | 224/438 |
| 5,332,134 | A * | 7/1994 | Chen | B62J 7/04 |
| | | | | 224/558 |
| 6,299,042 | B1 * | 10/2001 | Smith | B62J 7/04 |
| | | | | 224/413 |
| 6,843,396 | B2 * | 1/2005 | Champagne | B62J 7/04 |
| | | | | 224/438 |
| 7,261,227 | B2 * | 8/2007 | Lee | B62H 5/00 |
| | | | | 224/431 |
| 7,472,958 | B2 * | 1/2009 | Sano | B60N 2/146 |
| | | | | 297/344.21 |
| 8,360,288 | B2 * | 1/2013 | Shih | B62J 7/00 |
| | | | | 224/450 |
| 8,910,842 | B2 * | 12/2014 | Dodman | B62J 7/06 |
| | | | | 224/444 |
| 9,010,598 | B2 | 4/2015 | Thompson | |
| 9,296,442 | B2 * | 3/2016 | van Balveren | B62J 7/04 |
| 9,440,696 | B2 | 9/2016 | Sakai | |
| 2004/0232183 | A1 | 11/2004 | Watanabe et al. | |
| 2006/0138185 | A1 * | 6/2006 | Lien | B62J 7/04 |
| | | | | 224/427 |
| 2010/0282801 | A1 * | 11/2010 | Willard | B62J 7/08 |
| | | | | 224/413 |
| 2011/0139843 | A1 | 6/2011 | Thomas et al. | |
| 2012/0205411 | A1 | 8/2012 | Lindloff | |
| 2014/0263506 | A1 | 9/2014 | Kishi et al. | |

FOREIGN PATENT DOCUMENTS

| | | | |
|---|---|---|---|
| DE | 38 24 610 A1 | 1/1990 | |
| DE | 299 06 623 U1 | 9/1999 | |
| DE | 10 2004 020 592 A1 | 12/2004 | |
| DE | 10 2009 003 243 A1 | 11/2010 | |
| DE | 10 2013 223 317 A1 | 5/2015 | |
| DE | 10 2014 223 048 A1 | 5/2016 | |
| DE | 202018105958 U1 * | 1/2019 | ............... B62J 7/08 |
| EP | 2 586 684 A1 | 5/2013 | |
| EP | 2 597 019 A1 | 5/2013 | |
| EP | 2 783 955 B1 | 12/2015 | |
| FR | 2 896 762 A1 | 8/2007 | |
| JP | 55-101678 U | 7/1980 | |
| KR | 20-0479097 Y1 | 12/2015 | |

OTHER PUBLICATIONS

International Search Report (PCT/ISA/210) issued in PCT Application No. PCT/EP2018/065917 dated Aug. 22, 2018 with English translation (six pages).

German-language Written Opinion (PCT/ISA/237) issued in PCT Application No. PCT/EP2018/065917 dated Aug. 22, 2018 (five pages).

German-language Search Report issued in counterpart German Application No. 10 2017 212 790.2 dated Mar. 20, 2018 with partial English translation (12 pages).

Chinese-language Office Action issued in Chinese Application No. 201880044368.4 dated Aug. 12, 2020 with English translation (20 pages).

Chinese language Office Action issued in Chinese Application No. 201880044368.4 dated Feb. 20, 2021 with English translation (12 pages).

* cited by examiner

CARRIER ARRANGEMENT FOR LATERAL LUGGAGE CONTAINERS OF A MOTORCYCLE

CROSS REFERENCE TO RELATED APPLICATIONS

This application is a continuation of PCT International Application No. PCT/EP2018/065917, filed Jun. 15, 2018, which claims priority under 35 U.S.C. § 119 from German Patent Application No. 10 2017 212 790.2, filed Jul. 26, 2017, the entire disclosures of which are herein expressly incorporated by reference.

BACKGROUND AND SUMMARY OF THE INVENTION

The invention relates to a connecting arrangement for the fastening of lateral luggage containers to a motor vehicle, in particular to a motorcycle or to a motorcycle-like vehicle, and to a correspondingly equipped motor vehicle.

Side bags or side cases are known from the prior art and constitute luggage containers which are commonly fastened laterally in the rear region of a motorcycle and which can be removed if required. Similar arrangements are also usable inter alia for motorcycle-like vehicles, such as motor scooters or scooters, in particular two-wheeled, three-wheeled or four-wheeled motor scooters, and for quadbikes or trikes. Such an arrangement is known for example from EP 2 783 955 B1.

It has been found that these lateral luggage containers, in particular when loaded with luggage, can promote or intensify a wobbling tendency of the motorcycle. Great efforts are therefore commonly made with regard to the vehicle to reduce such a wobbling tendency, for example through complex adaptations of the running gear or by means of complex luggage carrier systems. By way of example, the latter may, as per U.S. Pat. No. 9,010,598 B2, comprise a parallelogram-like substructure to which the lateral luggage containers are fastened.

By means of this movable mounting, movement decoupling is achieved, which reduces a transmission of forces acting on the vehicle, in particular in the case of fast load alterations, to the lateral luggage containers and thus serves for stabilization of the overall vehicle.

It has however been found that the movable mounting in relation to the overall vehicle constitutes a design challenge, in particular with regard to a coordination between the intended oscillation-damping action and sufficient strength for a stable and load-bearing connection.

It is therefore an object of the invention to provide a vehicle having lateral luggage containers, which vehicle permits an oscillation-damping action along with a nevertheless simple construction and ease of handling.

Accordingly, a connecting arrangement for the fastening of lateral luggage containers to a motor vehicle, in particular to a motorcycle or to a motorcycle-like vehicle, is provided, having:
  a rear vehicle frame portion, and
  a carrier element which is designed so as to extend transversely with respect to a longitudinal direction of the vehicle frame portion and which, at a lateral left-hand end, is designed for connection to a left-hand luggage container and, at a lateral right-hand end, is designed for connection to a right-hand luggage container,
  wherein the carrier element is connected to the vehicle frame portion so as to be movable relative thereto.

The connecting arrangement thus provides a vehicle frame portion which, when in an installed state in the vehicle, is commonly connected to a structure or to a (remaining) vehicle frame of the motor vehicle. The vehicle frame portion may for example form a rear portion of the vehicle frame in the region of a rear wheel and define a substantially horizontally oriented portion. This may, in a vehicle vertical direction, be arranged below a seat or a seat bench. Likewise, the vehicle frame portion may be designed to support at least a part of the seat or of a seat bench, for example.

The carrier element is connected to the vehicle frame portion such that the carrier element is designed to extend at least in the transverse direction of said vehicle frame portion and such that, additionally, a relative movement of the carrier element with respect to the vehicle frame portion is possible. The transverse direction is aligned transversely with respect to the longitudinal direction of the vehicle frame portion, that is to say in a width direction of the vehicle frame portion. Furthermore, the carrier element is, at its two ends, connected in each case to one of the two luggage containers. These may thus be arranged for example on a left-hand side and a right-hand side of the vehicle frame portion. The longitudinal direction of the vehicle frame portion preferably corresponds, in the installed state, to a longitudinal direction of the motor vehicle itself.

In one embodiment, the carrier element may be arranged, and fastened in a relatively movable manner, on a top side of the vehicle frame portion. This means that the carrier element is positioned above the vehicle frame portion in the vehicle vertical direction. If a seat or a seat bench is present in this region, then the carrier element may furthermore be arranged below the seat or the seat bench, that is to say between the vehicle frame portion and the seat/seat bench in the vertical direction.

An arrangement below the vehicle frame portion is however alternatively also possible, such that the carrier element is arranged on a bottom side of the vehicle frame portion and is fastened in a relatively movable manner to said bottom side. The carrier element may however alternatively likewise also be arranged within the vehicle frame portion and extend through the latter.

Luggage containers are to be understood for example to mean side cases or side bags which are connected to the respective ends of the carrier element. Preferably, the respective connection is designed as a connection which is releasable as required in order to remove the respective luggage container from the motor vehicle, as will be described in detail below.

For example, the carrier element may comprise in each case one lateral carrying arm in the region of the left-hand and of the right-hand end and at least one transverse member which connects the lateral carrying arms to one another, wherein the two lateral carrying arms are each designed for connection to the respectively associated lateral luggage container.

It is thus possible, for example, for the lateral carrying arms to be aligned parallel and laterally spaced apart with respect to a central axis aligned in a longitudinal direction, or to be aligned substantially parallel to and spaced apart from a side of the vehicle frame portion. By contrast, the transverse member may be aligned in the transverse direction of the vehicle frame portion in order to connect the two lateral carrying arms to one another. In one exemplary embodiment, in the case of a single transverse member being used, it is thus possible for a U-shaped or double-T-shaped carrier element (as seen in a plan view) to be produced.

It is self-evidently likewise possible for more than one transverse member to be provided, in particular two transverse members. In a further embodiment, this offers the possibility of designing the carrier element as a frame element, in particular as a rectangular or trapezoidal frame element, wherein the lateral carrying arms are in each case connected to one another at their ends by means of one of the transverse members. In this way, the design of the carrier element as a frame element makes it possible to provide an intrinsically closed frame which has an advantageously increased stiffness, in particular increased torsional stiffness.

In any case, the carrier element may optionally be produced as a single-piece component. This may be realized by manufacturing as a single piece or by cohesive connection of multiple separately produced individual parts, for example by virtue of the lateral carrying arms being welded to the one or more transverse members.

Said relative movement may be defined for example by a translational movement transversely with respect to the longitudinal direction of the vehicle frame portion. This means that the carrier element is longitudinally movable in the transverse direction relative to the vehicle frame portion and is thus likewise movable transversely with respect to the overall motor vehicle. This offers the possibility of damping lateral movements, such as for example wobbling movements of the motor vehicle, by means of the inertia of the luggage containers owing to the movement decoupling that is realized.

For the translational movement, a movement extent y in the range of $-20 \text{ mm} \leq y \leq +20 \text{ mm}$, preferably $-10 \text{ mm} \leq y \leq +10 \text{ mm}$, particularly preferably $-7 \text{ mm} \leq y \leq +7 \text{ mm}$, may be provided, for example. This means that the carrier element connected to the vehicle frame portion can be displaced from a central neutral position selectively by at most 20 mm or at most 10 mm or at most 7 mm in the direction of the left-hand side or in the direction of the right-hand side. In this way, effective movement decoupling is provided, such that damping of wobbling movements of the vehicle is made possible.

The carrier element may for example be connected in translationally movable fashion to the vehicle frame portion by means of a number of bearing points, wherein the bearing points each have a guide portion for the guidance of the translational movement. For example, the bearing points may have slots or guide grooves which serve as guide portions for corresponding connecting pins which connect the carrier element to the vehicle frame portion. The connecting pins are preferably fixedly connected to the vehicle frame portion, and the guide portions are preferably assigned to, or formed in, the carrier element. A reversed arrangement is however self-evidently likewise possible.

At any rate, the slots preferably extend transversely with respect to the longitudinal direction of the vehicle frame portion, and thus in the described transverse direction, in order to guide the correspondingly aligned relative movement. A respective length of the guide portions is coordinated with the intended movement extent, such that the guide portions have at least the corresponding length or are selected to be longer. If they have the same length, then the respective ends of the guide portions may be utilized as stops for limiting the movement extent. Alternatively, the respective length may however also be selected to be longer, such that the ends do not serve as a stop, wherein, in this case, other stops may be provided for limiting the movement extent.

According to a further embodiment, the connecting arrangement may comprise at least two rail elements which are aligned transversely with respect to the longitudinal direction of the vehicle frame portion, wherein the carrier element is for example connected in translationally displaceable fashion to the rail elements by means of plain bearings. It is thus possible for the rail elements to be fixedly connected to the vehicle frame portion, such that the carrier element is movable in sliding fashion relative thereto. The rail elements may preferably be designed as extruded profiles, which can be produced particularly inexpensively and offer a reliable guide, and which are distinguished by particularly low friction, which directly influences the efficiency of the movement decoupling. In this embodiment, too, corresponding stops for limiting the stated translational movement extent may be provided. The plain bearings are preferably designed as plastics plain bearings and arranged so as to be easily exchangeable.

As an alternative to the purely translational relative movement, the relative movement may be defined by a rotational movement of the carrier element about a defined axis of rotation relative to the vehicle frame portion. This means that the carrier element is not movable in translational fashion in the transverse direction of the vehicle frame portion. Instead, the carrier element may be connected to the vehicle frame portion such that the carrier element is arranged so as to be rotatable relative thereto about an axis of rotation.

Preferably, for this purpose, the axis of rotation may be aligned substantially in a vertical direction of the vehicle frame portion. Correspondingly, the carrier element is moved in a movement plane perpendicular to this. In other words, the axis of rotation thus forms the normal with respect to the movement plane. For example, said movement plane is arranged substantially parallel to the top side of the vehicle frame portion. An alignment substantially in a vertical direction is to be understood to mean not only an absolutely parallel alignment of the axis of rotation with respect to the vertical direction of the vehicle frame portion (and thus of the overall vehicle) but likewise an alignment of the axis of rotation tilted slightly relative to the vertical direction by up to approximately +/-10° in the longitudinal direction of the vehicle frame portion. Correspondingly, the movement plane of the carrier element and thus also the carrier element itself are tilted by this angle, such that the axis of rotation is nevertheless aligned as a normal to the movement plane. The axis of rotation is preferably arranged in any case on a central axis, aligned in a longitudinal direction, of the vehicle frame portion.

A movement extent of the relative movement may for example encompass a rotation about the axis of rotation by a maximum angle $\alpha$ between $-10° \leq \alpha \leq +10°$, preferably between $-5° \leq \alpha \leq +5°$, particularly preferably between $-3° \leq \alpha \leq +3°$. This means that the carrier element connected to the vehicle frame portion can be rotated out of a central neutral position by at most the angle $\alpha$ of up to +10° or by up to -10° (preferably at most +5° and -5°, particularly preferably at most +3° and -3°) within the defined movement plane.

For example, the axis of rotation may be a real axis of rotation, which is defined by a rotary bearing, or a virtual axis of rotation. In the former case, the carrier element is rotatably connected by means of the rotary bearing to the vehicle frame portion in order to provide the described relative movement.

Alternatively, instead of the defined rotary bearing, it is however also possible for a guide slot to be provided which guides the rotational movement of the carrier element, such that the axis of rotation is defined not by a real rotary bearing but rather merely virtually, that is to say is provided as a resultant axis of rotation.

For this purpose, the carrier element may for example be connected in a relatively movable manner to the vehicle frame portion by means of a number of bearing points, wherein the bearing points each have a guide portion for the guidance of the rotational movement. For this purpose, too, the bearing points may have guide grooves or slots which serve as guide portions for corresponding connecting pins which connect the carrier element to the vehicle frame portion. The connecting pins are preferably fixedly connected to the vehicle frame portion and the guide portions are preferably assigned to, or formed in, the carrier element. A reversed arrangement is likewise possible.

The guide portions are preferably aligned so as to be of either straight or arcuate design and arranged in each case tangentially with respect to a circular path of the rotational movement or so as to lie on said circular path. A respective minimum length of the guide portions must be coordinated with the intended movement extent.

In each of the stated embodiments, the defined axis of rotation may be arranged in the longitudinal direction of the vehicle frame portion in front of a geometrical center of gravity of the carrier element. In this way, an eccentric arrangement is provided, wherein a lever action for the rotation of the carrier element can be influenced in accordance with the selected spacing. Accordingly, the spatial arrangement in front of the geometrical center of gravity constitutes a particularly advantageous arrangement.

Furthermore, the defined axis of rotation may be arranged within the carrier element. This is to be understood to mean that the axis of rotation intersects a surface defined by the carrier element. This optional condition also has an advantageous influence on the rotational movement for the simple coordination and particularly high effectiveness for the damping of the wobbling movements of the motor vehicle. The combination with the simultaneous arrangement in front of the geometrical center of gravity is particularly preferred.

For example, a spacing of the axis of rotation to a front side of the carrier element may correspond to less than ½, preferably less than ⅓, of an overall length of the carrier element aligned in the longitudinal direction of the vehicle frame portion. In other words, the axis of rotation is thus arranged in the front half, preferably in the front third, of the overall length, extending in the longitudinal direction of the vehicle frame portion, of the carrier element, in order to achieve the most optimum possible eccentric arrangement.

Alternatively, the described arrangement of the defined axis of rotation in front of the geometrical center of gravity of the carrier element in the longitudinal direction of the vehicle frame portion may however also be achieved by virtue of the axis of rotation not being arranged within the carrier element. Instead, the defined axis of rotation may be arranged in front of the carrier element, and thus outside the area defined by the carrier element, in the longitudinal direction.

At any rate, the lateral carrying arms may optionally each comprise at least one hook-in portion for the detachable hooking-in of the respective luggage container. This offers the possibility of fastening the luggage containers easily and securely to the carrier element. The luggage containers preferably have corresponding hook-in portions in a central or upper region (in a vertical direction) of a side facing toward the vehicle frame portion.

Also provided is a vehicle, in particular a motorcycle or a motorcycle-like vehicle, having a connecting arrangement for the fastening of the lateral luggage containers to the motor vehicle, wherein the connecting arrangement is designed as per this description.

In the context of this description, motorcycle-like vehicles are to be understood in particular to mean all single-track vehicles, or else multi-track vehicles, each with a corresponding saddle-like seat bench for the user, particularly preferably two-wheeled, three-wheeled or four-wheeled motor scooters or scooters, or else trikes and quadbikes.

Additionally and optionally, the vehicle may have, on a vehicle side, a rigid fastening projection which is connected to a vehicle frame and which is designed for detachable connection to the respective lateral luggage container, preferably for connection in a lower region of the luggage container. In this way, the luggage container is attached fixedly to the vehicle in this region, preferably fixedly to the vehicle but nevertheless rotatably, such that, owing to the connection to the carrier element, the luggage container describes a pivoting movement about the connecting point, fixed with respect to the vehicle, to the fastening projection.

The described connecting arrangement, by means of the carrier element arranged so as to be movable transversely with respect to the vehicle frame portion, makes possible effective movement decoupling and a reduction of the wobbling tendency of the vehicle. The facility for connection of the luggage containers to the carrier element and the connection thereof to the vehicle frame portion offers a particularly simple kinematic construction, which involves little maintenance and can omit fragile joints or other movable additional components. Owing to the carrier element as a central component, a high stiffness and a particularly compact and stable construction is offered, which can be integrated in inconspicuous fashion into the vehicle and can thus be easily "hidden". Furthermore, owing to the construction of the connecting arrangement, a considerable reduction in play of the moving parts, and an improved introduction of force of the case loads into the connecting arrangement and thus into the vehicle rear frame portion, are achieved, along with improved dimensional stability of the luggage container mounting.

The invention will be discussed in more detail below on the basis of exemplary embodiments with reference to the drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
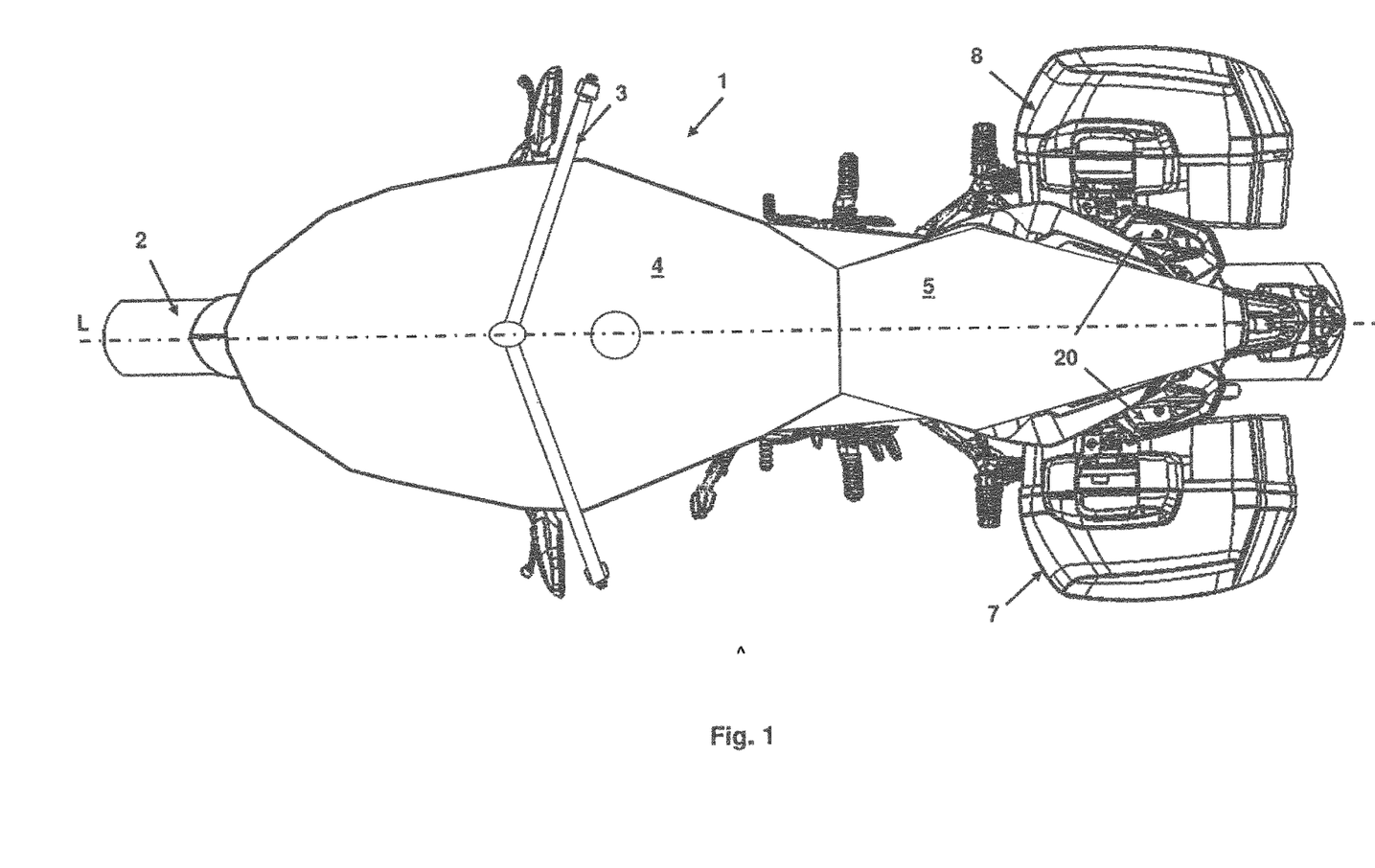
FIG. 1 shows a plan view of a motorcycle with lateral luggage containers.

FIG. 1 illustrates, in a plan view, a motor vehicle in the form of a motorcycle 1 with lateral luggage containers 7, 8. The motorcycle 1 is, in part, illustrated merely schematically for the purposes of improved clarity, and comprises, in a longitudinal direction L, a front wheel 2, which is steerable by a handlebar 3. Behind a vehicle tank 4, there follows a seat bench 5 for a rider or additionally for a pillion passenger positioned behind the rider. Provided under the seat bench 5 in the rear part of the motorcycle 1, that is to say in the region of a rear wheel (not visible), is a connecting arrangement 20 which will be described in more detail in FIGS. 2 to 7.

Said connecting arrangement 20 is designed for the fastening of the lateral luggage containers 7, 8 to the motorcycle 1. Accordingly, via the connecting arrangement 20, a left-hand luggage container 7 is arranged on a left-hand side of the motorcycle 1 and a right-hand luggage container 8 is arranged on the right-hand side of the motorcycle 1.

Figure 2:
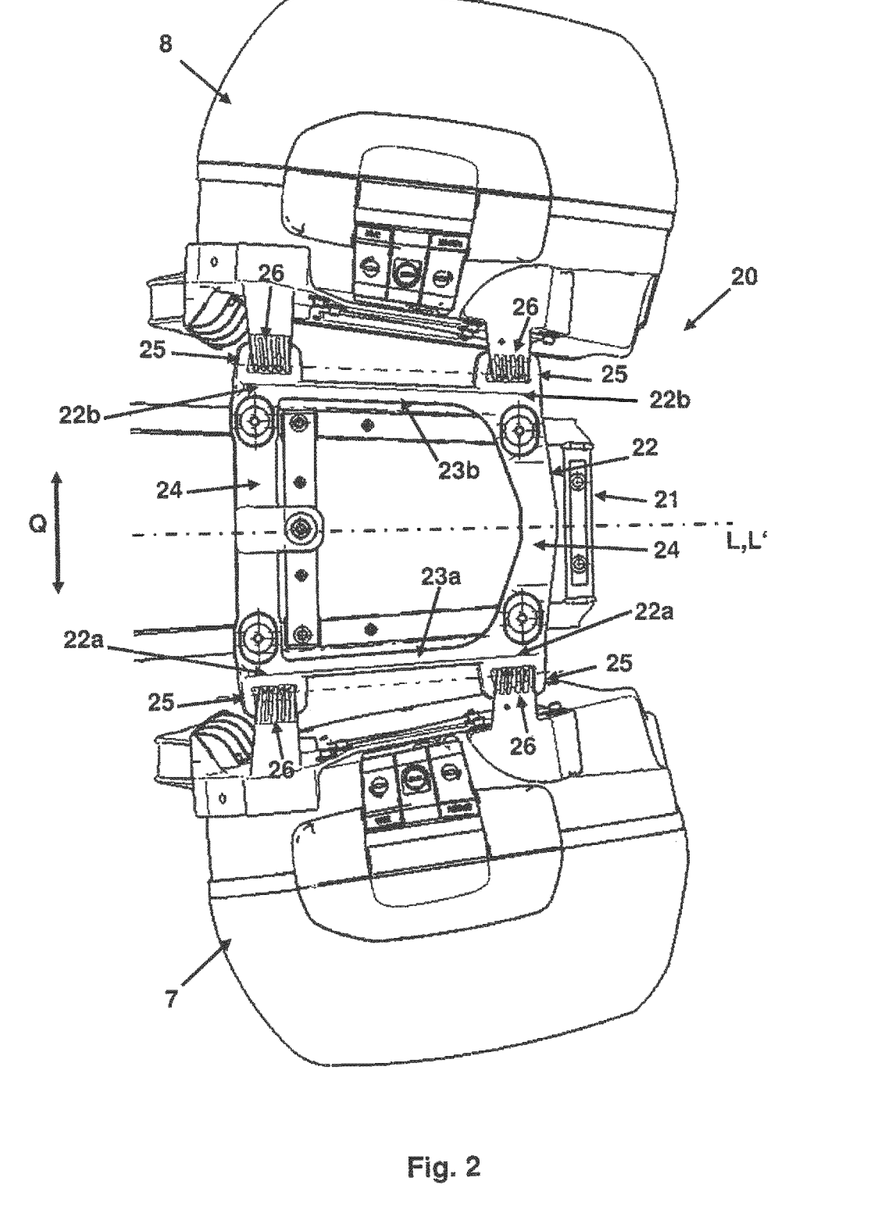
FIG. 2 shows a plan view of a connecting arrangement according to the description.

FIG. 2 shows a plan view of the connecting arrangement 20 from FIG. 1 after at least the seat bench 5 has been removed.

As described, the connecting arrangement 20 is designed for the fastening of the lateral luggage containers 7, 8 to the motorcycle 1 The connecting arrangement 20 comprises a carrier element 22 and at least one rear vehicle frame portion 21, which is defined for example by a rear-end frame of the motorcycle and which is rigidly connected to a main frame (not illustrated) of the motorcycle 1. The vehicle frame portion 21 comprises for example a left-hand and a right-hand longitudinal member, which extends substantially in the longitudinal direction L' and which are connected to one another by a connecting portion at their respective rear end. It is self-evident that the vehicle frame portion 21 may likewise have other components and/or a different geometry.

At any rate, the carrier element 22 is arranged on a top side of the vehicle frame portion 21 and so as to extend transversely with respect to a longitudinal direction L' of the vehicle frame portion 21. This also means that the carrier element 22 is, in an installed state, positioned between the top side of the vehicle frame portion 21 and the seat bench, which may be arranged thereabove, in a vehicle vertical direction. The longitudinal direction L' of the vehicle frame portion 21 is in this case identical to the longitudinal direction L of the motorcycle 1.

Alternatively, and therefore in a manner which is not illustrated, it is however also possible for an arrangement to be arranged below the vehicle frame portion or within the vehicle frame portion.

The carrier element 22 is designed, at a lateral left-hand end 22a, for connection to the left-hand luggage container 7 and, at a lateral right-hand end 22b, for connection to the right-hand luggage container 8. The connection between the carrier element 22 and the vehicle frame portion 21 arranged therebelow (in the vehicle vertical direction) is designed such that the carrier element 22 is connected to the vehicle frame portion 21 so as to be movable relative thereto.

The carrier element 22 comprises in each case one lateral carrying arm 23a, 23b in the region of the left-hand 22a and of the right-hand end 22b, and two transverse members 24 which connect the lateral carrying arms 23a, 23b to one another. Furthermore, the two lateral carrying arms 23a, 23b are each designed for connection to the associated lateral luggage container 7, 8. For this purpose, the carrying arms 23a, 23b have—as can be seen in FIGS. 3 to 7—two hook-in portions 25 at their respective outer ends, which hook-in portions project in a transverse direction Q (that is to say point in the direction of the luggage containers 7, 8) and each comprise a depression or recess into which the respective luggage container 7, 8 can be inserted with engaging action by way of in each case two corresponding projections 26, in particular two hook-like projections or hook-like undercuts, and can be removed as required. Instead of two projections, it is self-evidently likewise possible for only one or more than two projections 26 to be provided per luggage container 7, 8.

The carrier element 22 is designed as a frame element which has an approximately rectangular or at least trapezoidal shape by virtue of the lateral carrying arms 23a, 23b being connected to one another at their ends in each case by means of one of the two transverse members 24.

Figure 3:
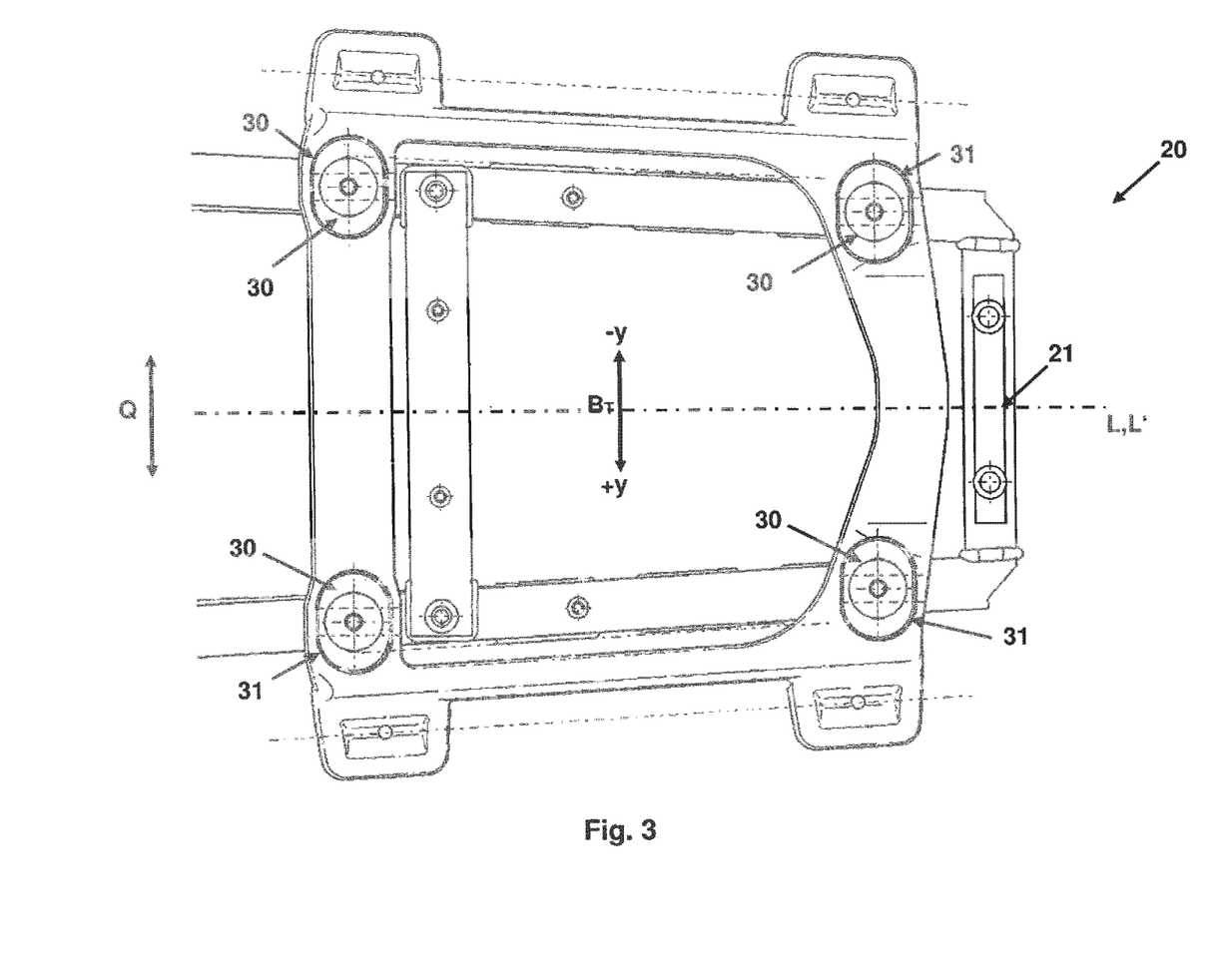
FIG. 3 shows a plan view of a first embodiment of the connecting arrangement.

FIG. 3 shows a plan view of a first embodiment of the connecting arrangement 20 that has already been described in FIGS. 1 and 2.

In this first embodiment, the relative movement of the carrier element 22 with respect to the vehicle frame portion 21 arranged therebelow is defined by a translational movement $B_T$ of the carrier element 22 transversely with respect to the longitudinal direction L' of the vehicle frame portion 21, that is to say in the transverse direction Q.

For this purpose, the carrier element 22 is connected in a translationally movable fashion to the vehicle frame portion 21 by a number of bearing points 30, with four bearing points 30 being illustrated, wherein the bearing points 30 each have a guide portion 31 for the guidance of the translational movement $B_T$. For the translational movement, a movement extent of $-20$ mm$\leq$y$\leq$+20 mm, preferably $-10$ mm$\leq$y$\leq$+10 mm, particularly preferably $-7$ mm$\leq$y$\leq$+7 mm, may for example be provided. This means that the carrier element 22 connected to the vehicle frame portion 21 can be displaced from the illustrated central neutral position selectively by up to 20 mm, preferably up to 10 mm, particularly preferably up to 7 mm, in the direction of the left-hand side or correspondingly in the direction of the right-hand side. In this way, effective movement decoupling is provided, such that effective damping of wobbling movements of the vehicle 1 is made possible.

Figure 4:
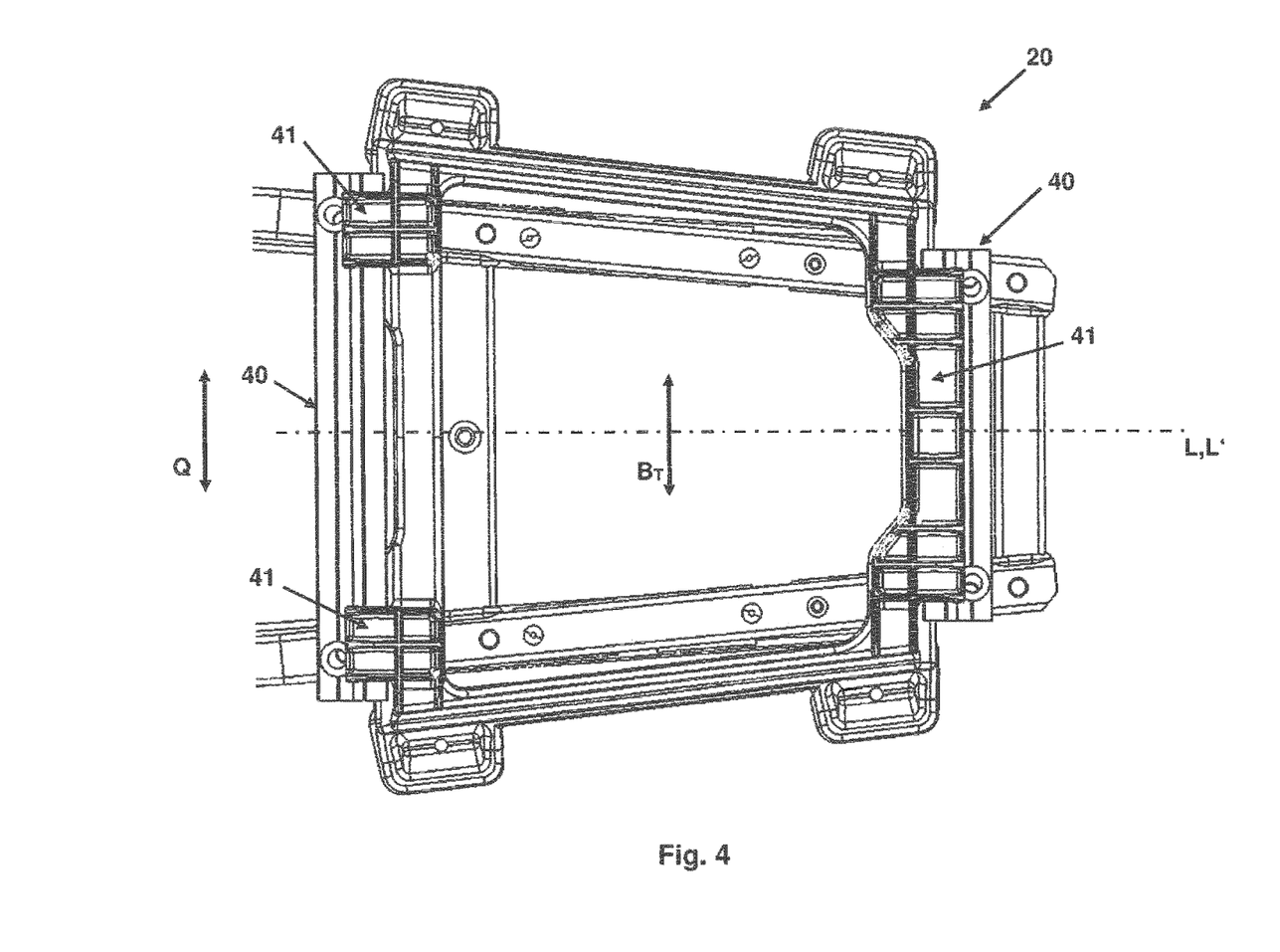
FIG. 4 shows a plan view of a second embodiment of the connecting arrangement.

FIG. 4 illustrates, in a plan view, a second embodiment of the connecting arrangement 20, which likewise provides a relative movement of the carrier element 22 with respect to the vehicle frame portion 21, arranged therebelow, by a translational movement $B_T$ of the carrier element 22 transversely with respect to the longitudinal direction L' of the vehicle frame portion 21, that is to say in the transverse direction Q.

By contrast to the first embodiment illustrated in FIG. 3, the connecting arrangement 20 comprises two rail elements 40 aligned transversely with respect to the longitudinal direction L' of the vehicle frame portion 21. Said rail elements are arranged parallel to and spaced apart from one another in the longitudinal direction L', such that the carrier element 22 is connected in translationally displaceable fashion to the rail elements 40 by means of plain bearings 43 that are illustrated in more detail in FIG. 5.

Figure 5:
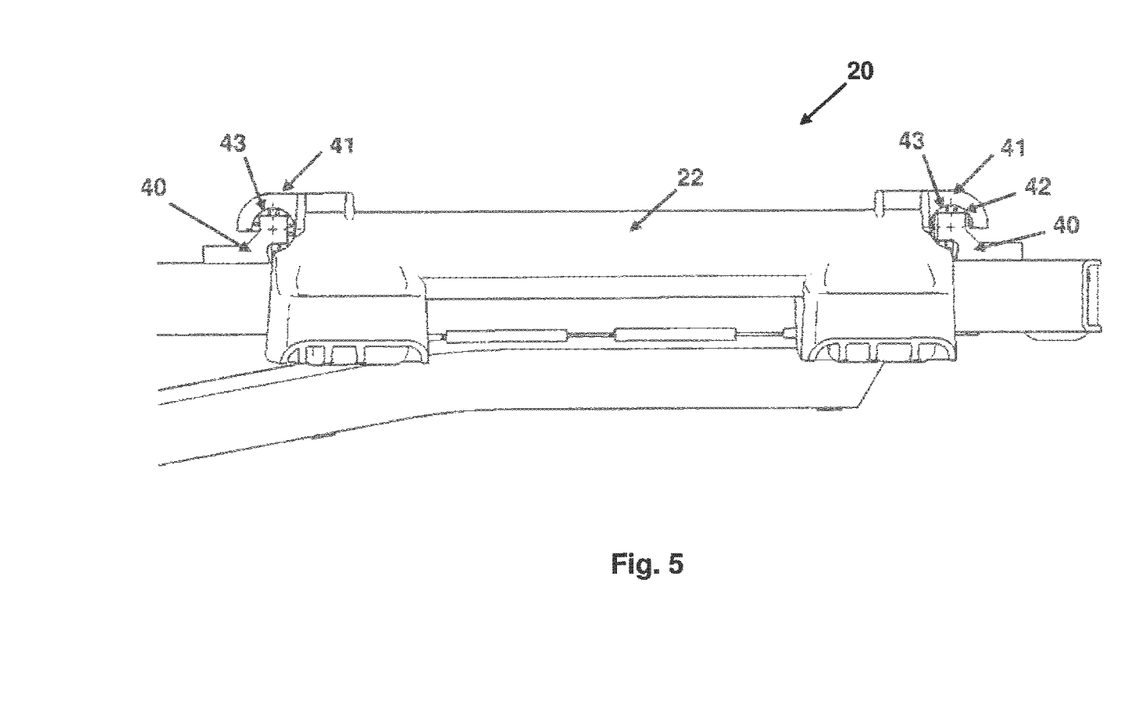
FIG. 5 shows a side view of the second embodiment from FIG. 4.

As shown in the side view of the second embodiment illustrated in FIG. 5, the carrier element 22 has, in the illustrated embodiment, projections 41 which extend in the direction of the rail elements 40 and which comprise recesses 42, which 42 partially engage around the rail elements 40 and in which the plain bearings 43 are arranged. As illustrated, the rail elements 40 may be designed for example as extruded profiles.

Figure 6:
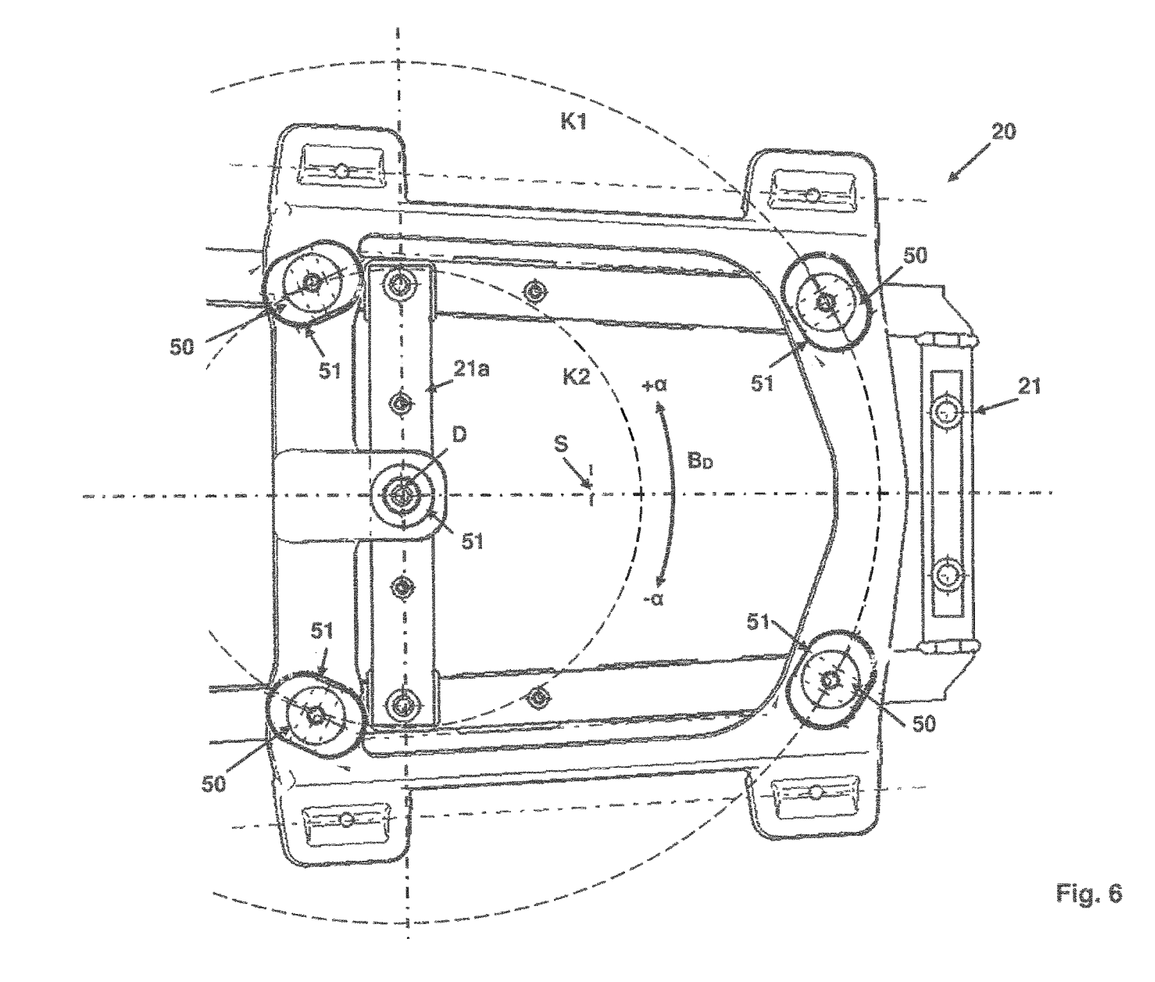
FIG. 6 shows a plan view of a third embodiment of the connecting arrangement.

FIG. 6 shows a plan view of a third embodiment of the connecting arrangement 20. This substantially corresponds to the other embodiments, such that, for identical components or at least components of identical action, the same reference designations are used, and reference is made to the descriptions of FIGS. 1 to 5.

The illustrated third embodiment differs in that the relative movement is defined by a rotational movement $B_D$ of the carrier element 22 about a defined axis of rotation D relative to the vehicle frame portion 21. Here, the axis of rotation D is aligned in a vertical direction of the vehicle frame portion 21 or of the overall motorcycle 1 (that is to say perpendicular to the plane of the drawing of FIG. 6). The axis of rotation D is formed by a real axis of rotation D which is defined by a rotary bearing 51. In the illustrated embodiment, the axis of rotation D is, as viewed in a transverse direction, arranged in a center, that is to say on the longitudinal direction L' of the vehicle frame portion 21. For this purpose, the rotary bearing D is connected to a frame transverse member 21a which connects the two longitudinal members of the vehicle frame portion 21.

A movement extent of the relative movement, that is to say of the rotational movement $B_D$, may for example encompass a rotation about the axis of rotation D by a maximum angle $\alpha$ between $-10°\leq\alpha\leq+10°$, preferably between $-5°\leq\alpha\leq+5°$, particularly preferably between $-3°\leq\alpha\leq+3°$. This means that the carrier element 22 connected to the vehicle frame portion 21 can be rotated out of a central neutral position (that is to say proceeding from an alignment in the longitudinal direction L') by at most the angle $\alpha$ of up to +10° or by up to −10° (preferably at most +5° and −5°, particularly preferably at most +3° and −3°) within the defined movement plane.

To achieve reliable guidance of the rotational movement $B_D$ about the axis of rotation D, the carrier element 22 is optionally connected in a relatively movable manner to the vehicle frame portion 21 by a number of bearing points 50 in addition to the rotary bearing D, wherein the bearing points 50 each have a guide portion 51 for the guidance of the rotational movement $B_D$. Four bearing points 50 are illustrated, wherein it is likewise possible for only two or else more than four bearing points to be provided.

The guide portions 51 are preferably each designed as a slot or curved guide groove, which are arranged tangentially with respect to a respective circular path K1, K2 or with their curvature along the respective circular path K1, K2. The centers of all circular paths K1, K2 are arranged coaxially with respect to the axis of rotation D.

Figure 7:
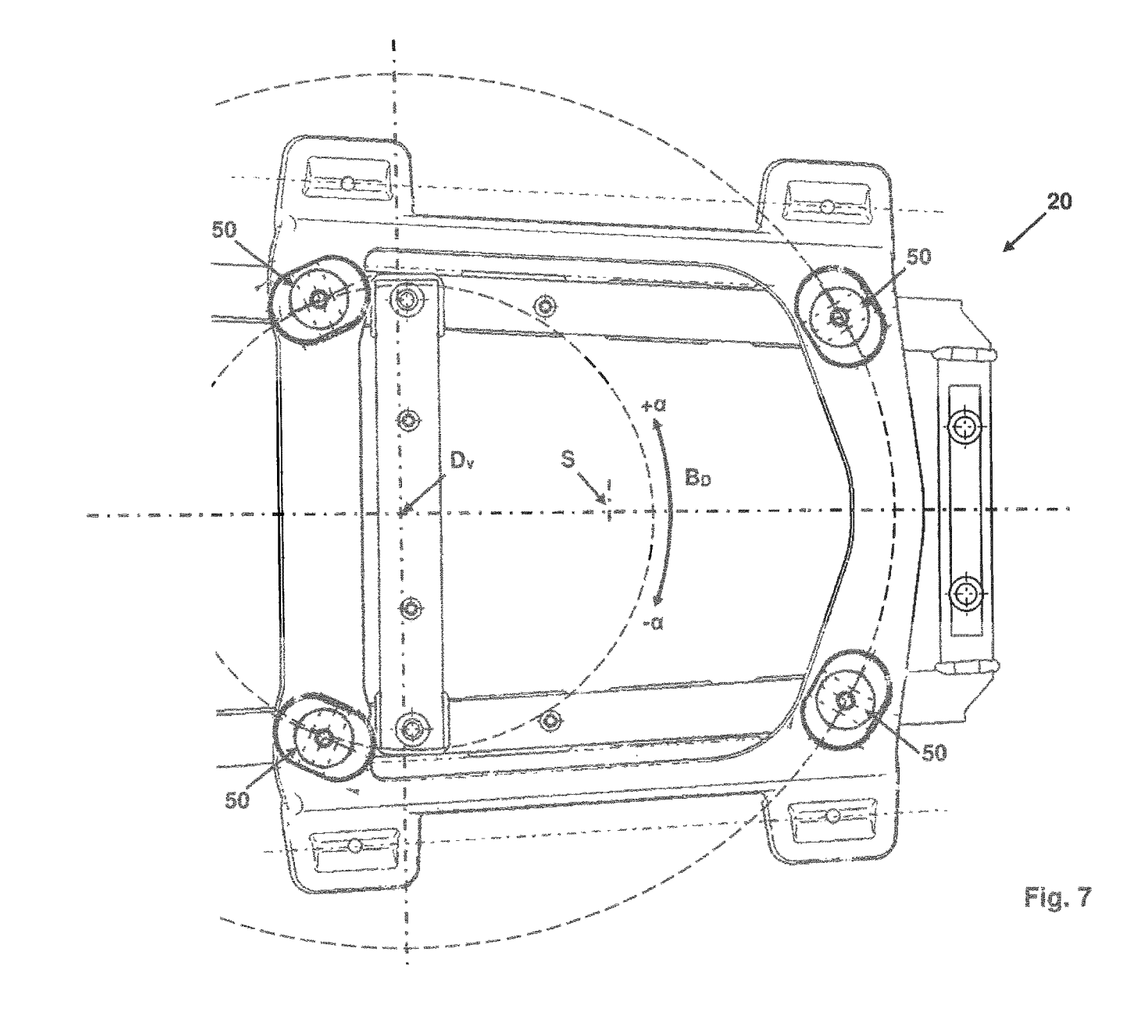
FIG. 7 shows a plan view of a fourth embodiment of the connecting arrangement.

FIG. 7 shows a plan view of a fourth embodiment of the connecting arrangement 20. This substantially corresponds to the third embodiment as per FIG. 6, such that, for identical components or at least components of identical action, the same reference designations are used, and reference is made to the descriptions of FIG. 6.

The illustrated fourth embodiment likewise provides a relative movement which is defined by a rotational movement $B_D$ of the carrier element 22 about a defined axis of rotation $D_v$ relative to the vehicle frame portion 21.

By contrast to the third embodiment, however, the real axis of rotation, or a rotary bearing 51 that defines the axis of rotation D, is omitted. A virtual axis of rotation $D_v$ is provided instead.

This is provided by virtue of the carrier element 22 being connected in a relatively movable manner to the vehicle frame portion 21 exclusively by the number of bearing points 50, wherein the bearing points 50 each have a guide portion 51 for the guidance of the rotational movement. A movement extent of the rotational movement $B_D$ is selected as per the third embodiment.

For both embodiments with a rotationally movable carrier element 22, that is to say the third and fourth embodiments, the defined axis of rotation D is, in the longitudinal direction L' of the vehicle frame portion 21, arranged in front of a geometrical center of gravity S of the carrier element 22. Additionally, the defined axis of rotation D is arranged within the carrier element 22 and intersects the area defined and delimited by the carrier element 22.

Alternatively, and therefore in a manner which is not illustrated, the defined real or the virtual axis of rotation D, $D_v$ may be arranged in front of the carrier element 22 in the longitudinal direction L.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting arrangement for the fastening of lateral luggage containers to a motor vehicle, comprising:
   a vehicle frame portion; and
   a carrier element configured to be connected to the vehicle frame portion in a manner permitting relative movement between the carrier element and the vehicle frame during operation of the motor vehicle, the carrier element extending transversely with respect to a longitudinal direction of the vehicle frame portion,
   wherein the carrier element has a lateral left-hand end configured to be connected to a left-hand luggage container and a lateral right-hand end configured to be connected to a right-hand luggage container.

2. The connecting arrangement according to claim 1, wherein
   the carrier element includes a lateral carrying arm at the lateral left-hand end and a lateral carrying arm at the lateral right-hand end, each of the lateral carrying arms being configured to be connected to respective ones of the left-hand and right-hand luggage containers, and
   at least one transverse member connecting the lateral carrying arms to one another.

3. The connecting arrangement according to claim 2, wherein
   the lateral carrying arms are in each case connected to one another at their ends by the at least one a transverse member, and
   the carrier element is a rectangular-shaped or a trapezoidal shaped frame element.

4. The connecting arrangement according to claim 1, wherein
   the relative movement is a translational movement transversely with respect to the longitudinal direction of the vehicle frame portion.

5. The connecting arrangement according to claim 4, wherein
   the carrier element is connected to the vehicle frame portion by a plurality of bearing points, and
   each of the bearing points have a guide portion configured to guide the translational movement.

6. The connecting arrangement according to claim 4, further comprising:

at least two rail elements aligned transversely with respect to the longitudinal direction of the vehicle frame portion, wherein the carrier element is connected in translationally displaceable fashion to the rail elements by plain bearings.

7. The connecting arrangement according to claim 1, wherein the relative movement is a rotational movement of the carrier element relative to the vehicle frame portion about an axis of rotation.

8. The connecting arrangement according to claim 7, wherein the axis of rotation is aligned in a vertical direction of the vehicle frame portion.

9. The connecting arrangement according to claim 8, wherein the axis of rotation is an axis of rotation of a rotary bearing or a virtual axis of rotation.

10. The connecting arrangement according to claim 7, wherein the carrier element is connected for movable relative to the vehicle frame portion by a plurality of bearing points, and each of the bearing points has a guide portion configured to guide the rotational movement.

11. The connecting arrangement according to claim 9, wherein the axis of rotation is located in front of a geometric center of the carrier element in the longitudinal direction of the vehicle frame portion.

12. The connecting arrangement according to claim 11, wherein the axis of rotation is located within the carrier element.

13. The connecting arrangement according to claim 2, wherein the lateral carrying arms each include at least one hook-in portion configured for detachable hooking-in of the respective luggage container.

14. A vehicle, comprising:

a connecting arrangement for fastening of lateral luggage containers to the motor vehicle in accordance with claim 1.

15. The vehicle according to claim 14, further comprising:

a rigid fastening projection at each of a left side and a right side of a frame of the vehicle which includes the vehicle frame portion, wherein each of the rigid fastening projections is configured to receive the respective left-hand luggage container and right-hand luggage container, and each of the rigid fastening projections is configured to cooperate with lower regions of the respective left-hand luggage container and right-hand luggage container.

* * * * *